Nov. 11, 1930.  P. GROENENSTEIN  1,781,545

GLARE SHIELD

Filed Dec. 30, 1926

Inventor

Philip Groenenstein

By Bates, Macklin Golnick & Fear
Attorneys.

Patented Nov. 11, 1930

1,781,545

UNITED STATES PATENT OFFICE

PHILIP GROENENSTEIN, OF CLEVELAND, OHIO

GLARE SHIELD

Application filed December 30, 1926. Serial No. 157,896.

This invention relates to glare shields, particularly those used inside a motor vehicle and adapted to be adjustably positioned by the driver to cut off the glare of approaching lights, and, when not in use, to be moved upwardly out of the normal line of vision. An important object of the present invention is to make a shield wherein the principal operating parts are concealed from view and are also protected from exposure to the elements. In this connection my invention contemplates the provision of a shield which is compact in shape and can be readily attached to any motor vehicle in an expeditious manner.

Figure 1:
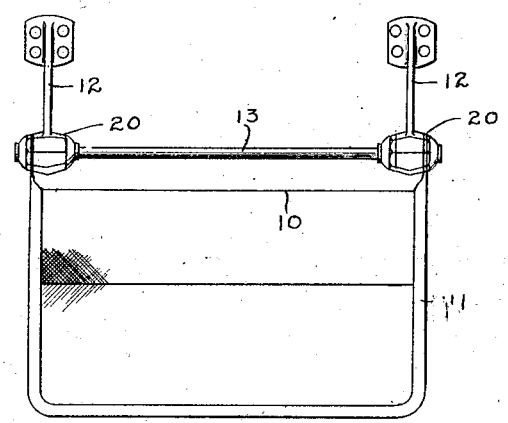
Figure 2:
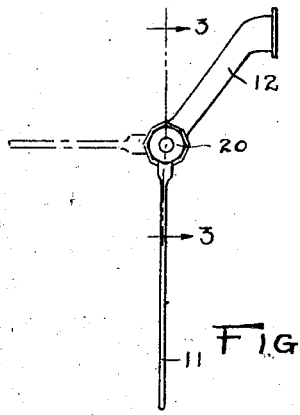
Figure 3:
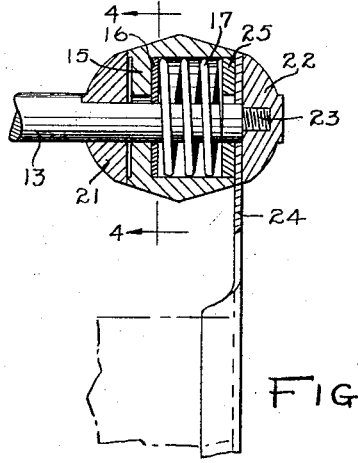
Figure 6:
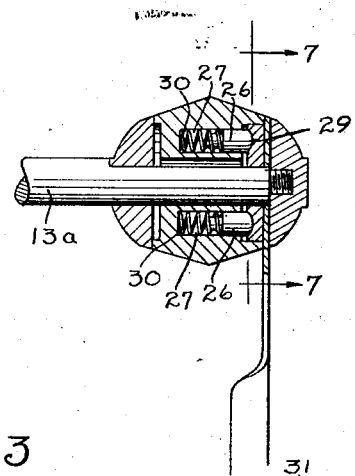
Figure 7:
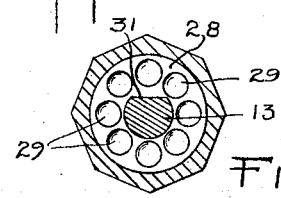
Figure 4:
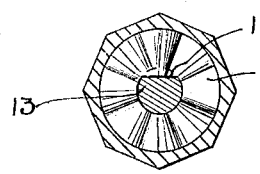
Figure 5:
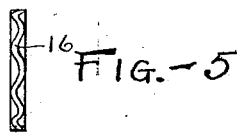

In the drawings, Fig. 1 is a front elevation and Fig. 2 is a side elevation of a shield embodying my invention; Fig. 3 is an enlarged sectional view taken through the shield on a plane indicated by the line 3—3 in Fig. 2; Fig. 4 is a section taken through that portion of the shield indicated in Fig. 3, and more particularly, on a plane indicated by the line 4—4 in Fig. 3; Fig. 5 is an end view of part of the indexing mechanism shown in Fig. 4; Fig. 6 is a sectional view similar to Fig. 3 and showing a modified form of indexing mechanism; Fig. 7 is a section taken through the apparatus shown in Fig. 6, and more particularly, on a plane indicated by the line 7—7 in Fig. 6.

My glare shield is shown as having a visor 10 which may be made of any transparent material and which may be mounted within the boundary frame 11 (mostly U-shaped in cross-section) which in turn is arranged to be pivotally mounted upon supporting arms 12. These arms are adapted to be attached to the interior of a motor vehicle in any convenient manner.

A shaft 13 extends between the arms and functions to cooperate with the visor frame to provide a pivotal connection with the arms. An indexing mechanism is associated with the shaft and is arranged to hold the visor in any adjusted position. One form of indexing mechanism, as indicated in Fig. 3, embodies a pair of cooperating members 15 and 16, one of which is preferably an integral part of the arm while the other is splined to the shaft 13. A spring 17 also mounted within the arm functions to urge the members into operative engagement and permits the turning of one with relation to the other for indexing purposes. The member 16, as shown in Figs. 4 and 5, is a radially corrugated circular member having a flat portion 18 which permits sliding of the member along the shaft while it is being rotated therewith.

To make a complete closure for the indexing mechanism, I have shown each arm as having an enlarged bearing 20, adjacent the end thereof. This bearing is in the nature of a cylindrical housing having sufficient length to enclose the indexing members and associated spring. One end of the bearing is shown as being closed by a cap 21, while the other end is shown as being closed by another cap in the nature of a nut 22, which is arranged to be threaded onto the end 23 of the shaft.

The end portions 24 of the visor frame 11 are flattened and are arranged to fit over the shaft and to be rigidly connected therewith, as by a splined connection similar to that indicated at 18 on the member 16, and adapted to be locked in place by the cap 22. A washer 25 completes the assembly and provides an abutment for the spring 17.

If desired, the indexing mechanism could be mounted only on one arm, but to insure a rigid construction I prefer to mount the mechanism in each arm in substantially the same way.

In Figs. 6 and 7, I have shown a modified form of indexing mechanism which comprises a pair of plungers 26 which are slidably mounted within the passageway 27 within the housing 20. In this case, the housing is only bored sufficiently to permit turning of the shaft 13A, so that ample metal will be provided to permit the use of spring-actuated plungers therein. These plungers form one member of the indexing mechanism. The other member is in the nature of a washer 28, having recesses 29 disposed therein at spaced intervals. The centers of these recesses are on a circuit which is concentric with the washer, wherefore the plungers will successively engage the recesses as the member 28 is rotated. The springs 30 which are disposed behind the plungers have sufficient force to hold the visor in any adjusted position. The member 28 may also be splined onto the shaft as by a straight portion 31, similar to that illustrated in Fig. 4. The remaining construction of the shield is substantially the same.

A shield embodying my invention is advantageous in that all indexing mechanism, including the springs, can be enclosed within the supporting arms. This makes a neat and compact construction and at the same time provides a shield wherein the operating parts are completely enclosed. Thus I can pack the interior of each arm with lubricant and adequately protect them from exposure to the elements.

I claim:

A glare shield having in combination, a pair of independent supporting arms, each arm having a passageway extending therethrough, a shaft extending between and through each of said arms and projecting beyond the end of each arm, an indexing couple between the shaft and each arm, said couple having one member rigid with the associated arm, and having the other member rigid with the shaft, a spring mounted in each passageway and operating upon the members of the couple to hold them in engagement with each other, a visor, a frame therefor, a frame extension rigidly mounted upon the shaft and means outside the frame and engaging the shaft for holding all of said members in assembled relationship.

In testimony whereof, I hereunto affix my signature.

PHILIP GROENENSTEIN.